July 14, 1953  R. J. HAYTER  2,645,344
EGG-GRADING MACHINE
Filed Aug. 21, 1950  2 Sheets—Sheet 1
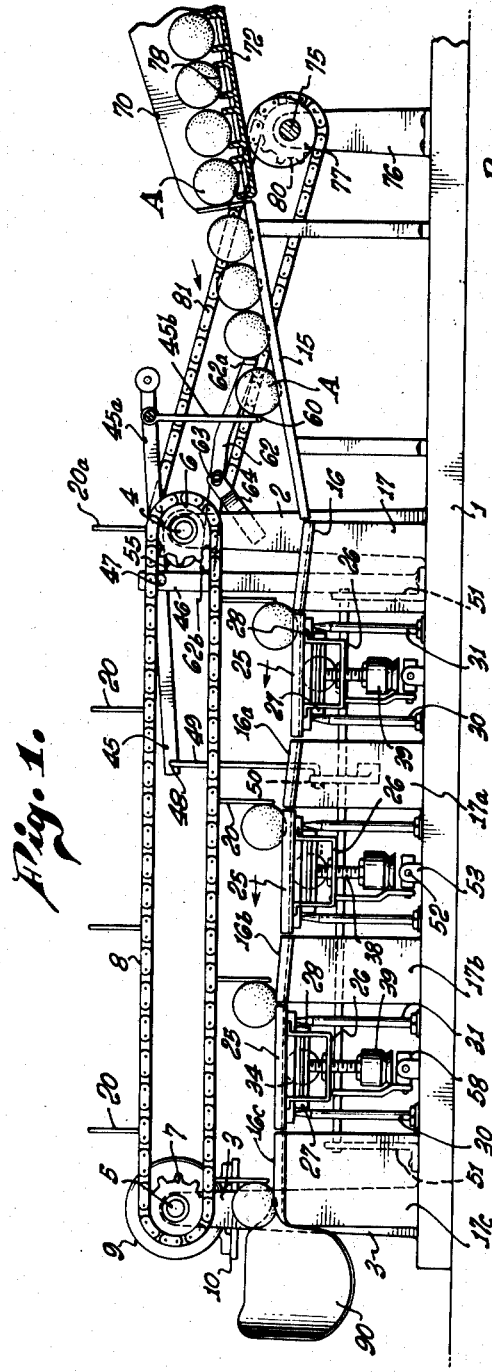
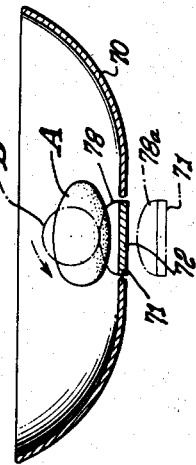
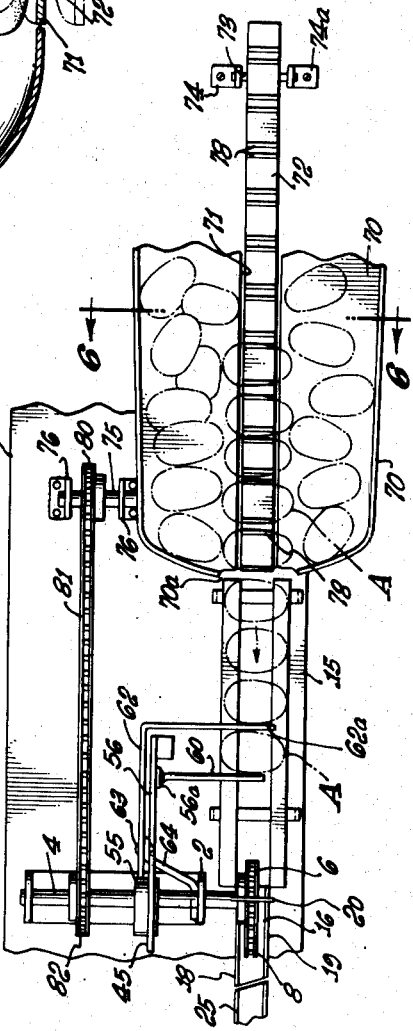
INVENTOR:
R. J. HAYTER,
BY
ATTORNEY.

July 14, 1953 R. J. HAYTER 2,645,344
EGG-GRADING MACHINE
Filed Aug. 21, 1950 2 Sheets-Sheet 2

INVENTOR:
R. J. HAYTER,
BY
O. O. Martin
ATTORNEY.

Patented July 14, 1953

2,645,344

UNITED STATES PATENT OFFICE 2,645,344

EGG-GRADING MACHINE

Richard J. Hayter, North Hollywood, Calif.

Application August 21, 1950, Serial No. 180,540

4 Claims. (Cl. 209—121)

This invention relates to egg grading machines of the type in which eggs are continuously fed across the platforms of a series of weighing scales, the first one of which is adjusted to yield to eggs of the maximum commercially used weight, the remaining scales being successively adjusted to yield to eggs of lesser weight.

It is the object of my invention to provide a machine of the type referred to into which eggs are continuously and automatically fed. A further object is to provide in the machine a series of weighing scales of greatly improved construction. Another object is to provide improved means for controlling the passage of eggs through the machine. A still further object is to provide simple cam means for timing and actuating the various controlling means of the device.

With these and other objects in view the invention consists of the combinations hereinafter described in detail and reference is invited to the accompanying drawings in which a preferred form of the device is illustrated.

In the drawings:

Fig. 1 is a side elevational view of a device embodying the invention;

Fig. 2 is a plan view of a portion of the device of Fig. 1;

Fig. 6 is an end view thereof taken substantially on line 6—6 of Fig. 2.

Figure 5:
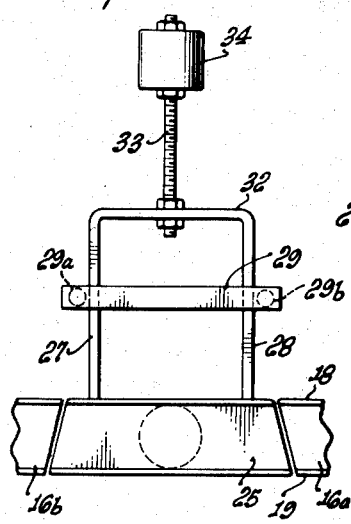
Fig. 5 is a plan view of the beam of one of the weighing scales.

As illustrated in the drawings, the mechanism of the device is mounted on a base 1 on which are placed posts 2, 3, the upper ends of which are perforated to receive shafts 4, 5. A pair of sprocket wheels 6, 7 are rigidly secured to these shafts in position to support a chain 8, which is driven in clockwise direction by means of an electric motor 9 or other suitable prime mover. The latter may, as indicated in Fig. 1, be mounted on a platform 10 at the top of the post 3.

Figure 3:
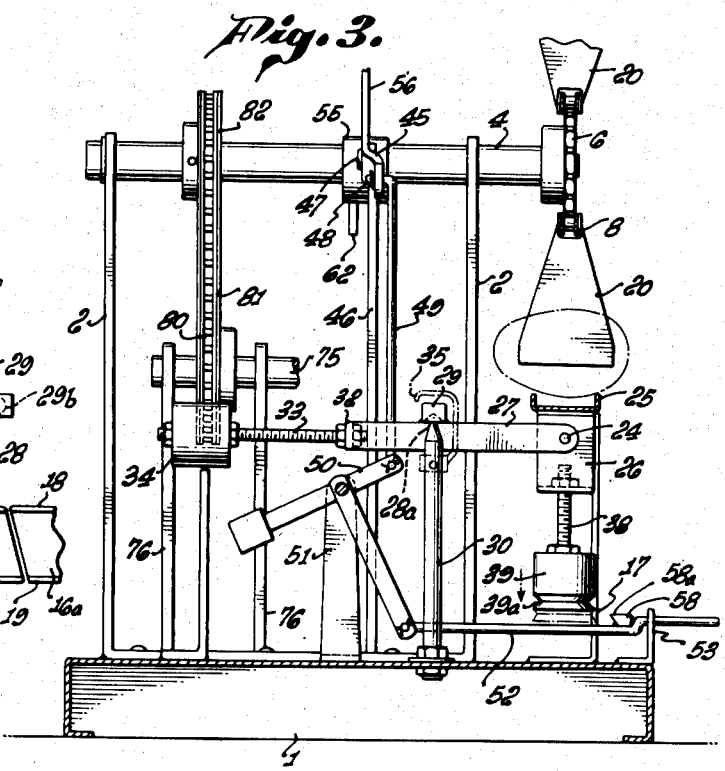
Fig. 3 illustrates, on a larger scale, one of the weighing scales of the device together with a portion of the mechanism controlling the operation thereof.
Figure 4:
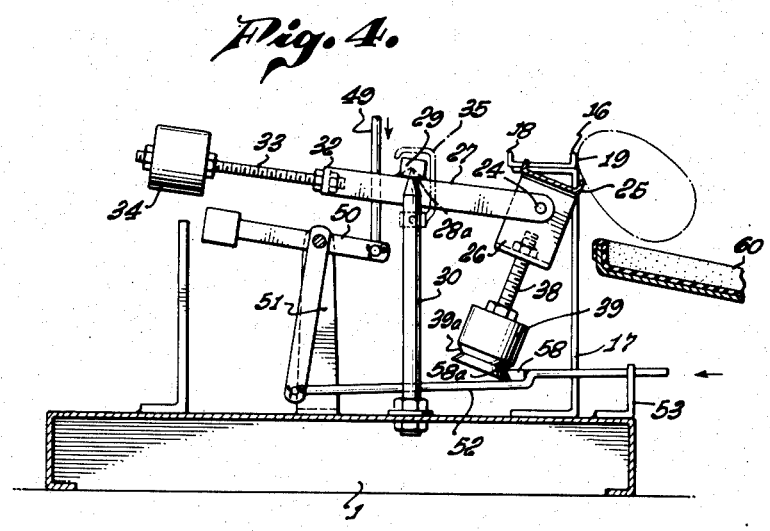
Fig. 4 shows the weighing scale of Fig. 3 in a different position of adjustment.

The eggs to be graded are by gravity fed along a chute 15 on to the main track of the machine. This track is made in sections 16, 16ª, etc., there being as many track sections in the machine as there are weighing scales and these weighing scales are placed in the openings between the track sections, substantially as indicated in Fig. 1 of the drawings. The track sections are supported on suitable stands 17, 17ª, etc. rising from the base of the machine. The track of each section consists of rails 18, 19 in properly spaced parallel relation to each other to support thereon the eggs to be graded, substantially as indicated in Fig. 3 of the drawings. The eggs are carried along this track by means of arms 20 which are suitably secured in position on the links of the sprocket chain 8.

The movement of the eggs along the track must, of course, be rather slow and it is necessary to provide in connection with the motor 9 suitable speed reducing devices, but as such devices are commonly used, it is not believed necessary to complicate the drawings by illustrating such means. It is, however, important to note that the tracks 16, 16ª, etc. rise slightly in the direction of advance movement of the eggs and this is found necessary in order to check forward movements of the eggs and to permit the arms 20 to retain complete control of the movement of the eggs relative to the timing of the other mechanisms of the device.

As above stated, a series of weighing scales are placed in the openings between the track sections and one of these scales is, in Fig. 3, shown to include a platform supporting a track section 25 which is mounted on a bracket 26 and the latter is, in turn, pivotally supported on the end of a beam consisting of a pair of levers 27, 28 extending from a cross bar 32. A bar 29 extends crosswise of these levers and it is rigidly secured to the upper edges thereof. The bottom of this bar is countersunk to provide V-shaped recesses 29ª, 29ᵇ of a size to ride on the upper pointed ends of posts 30, 31 rising from the base of the machine. The cross-bar 32 has in the center thereof a threaded perforation of a size to receive a screw rod 33 to the end of which is affixed a counter-weight 34. This assembly constitutes the beam of the scale. The weight 34 is axially movable along the screw rod to adjust the mechanism to the weight of the egg which it is designed to grade. Guards 35 are shown secured to the posts 30, 31 and they extend over the cross bar 32 in such spaced relation thereto that they will not interfere with normal operation of the beam but will check accidental dislodgment of the beam.

Referring further to Fig. 3, it is noticed that a screw rod 38 is depending from bracket 26 in axial alignment with the pivot 24 thereof and it is, at the bottom thereof, fitted with a weight 39. Egg grading machines have been made in which track sections somewhat similar to the track section 25 have been rigidly mounted on the end of the beam of a weighing scale. In such machines it has been found that the weight imposed upon the track or platform of the weighing scale varies according to the position taken by the egg thereon. If, for instance, the heavier end of the egg is further away from the fulcrum of the levers, as indicated in Fig. 2, the weight imposed upon the weighing scale is less than if the egg took a position with the heavier end thereof nearer the fulcrum of the levers; but when the track sections 25 is pivotally mounted on the beam and is fitted with a bottom weight such as shown at 39, it is found that the platform is free to swing on its pivot according to the position taken by the egg thereon without affecting the functioning of the device.

When an egg of greater weight than that for which the weighing scale is adjusted reaches the platform 25, it causes the levers 27, 28 to swing on their pivots while the egg is slowly being advanced across the scale platform. During this movement, it becomes necessary to discharge the egg from the track 25 of the platform and this may be done in the following manner:

A lever 45 is pivotally hung on a post 46, as indicated at 47 in Fig. 1, and the forward end of this lever is perforated to receive a pivot 48 on which a connecting link 49 is hung. The lower end of this link is pivotally connected to a bellcrank 50 which, in turn, is mounted to swing on a post 51 of the machine base 1. A rod 52 is pivotally connected to the lower end of this bellcrank from which it extends horizontally underneath the weight 39 of the weighing scale platform. The outer free end of this rod is supported and guided within a bracket 53 of the machine base. A cam 55 is rigidly secured to the shaft 4 in position to swing an extension 45ª of the lever 45 upwardly at each revolution of the shaft thereby to swing the lever 45 downward and through the link 49 to impart clockwise rotation to the bellcrank 50. It is now noticed that the rod 52 is intermediate its ends shown offset and that a plate 58 is secured in inwardly inclined position on this offset portion of the rod. During the movement of the bellcrank, it is found that the rod is caused to move inwardly until the plate 58 reaches the lower end of the weight 39 and during the continued movement of the rod pushes this weight along a distance sufficiently to tip the scale platform. This permits the egg to roll away from the platform on to a shelf 60 which forms part of any suitable mechanism for carrying the egg to a packing station.

As above explained, the platform of the weighing scale is caused to descend when the egg thereon overbalances the counterweight 34 of the scale. When the difference in weight is considerable, it is found that the bottom weight 39 of the platform will descend a sufficient distance for the plate 58 to obtain a firm hold thereon, but if the difference in weight is slight, it may be found that the bottom weight 39 does not reach its lowermost position and that for this reason the plate 58 may not obtain a firm hold thereon. In order to overcome this difficulty and so as to make certain that the platform will be tipped to discharge the egg, I have provided at the bottom of the weight a V-shaped groove 39ª into which the forwardly pointed edge 58ª of the plate 58 will enter as the weight descends, thereby to obtain a firm hold on the weight. It is to be understood, of course, that the movement of the tilting rod 52 is so timed with the movement of the arms 20 of the sprocket chain that the discharging of the egg from the scale platform takes place while the egg is carried across the platform.

It was explained at the beginning of this description that the eggs are fed into the machine along an inclined chute 15. It becomes necessary at the point where the eggs pass from the chute on to the track 16 to provide means for controlling the advance movement of the eggs relative to the movement of the arms 20 of the sprocket chain and also to provide means permitting only one egg to pass on to the track directly in advance of the movement of the arm 20 toward the track. Such means is in Fig. 1 shown to consist of a rod 60 which is fastened to a downwardly directed extension 45ᵇ of the lever portion 45ª and which extends transversely in front of the egg A on the chute. This rod is, by the cam 55, caused to rise out of the way of the egg at the moment the arm 20ª approaches the egg on its forward movement around the sprocket wheel 6. The egg, being thereby released, will roll down the chute on to the track section 16. It is important to note, as above stated, that this track section is somewhat upwardly inclined in forward direction and that this is done in order to check the forward movement of the egg before it reaches the platform of the first scale, whereupon all further forward movement of the egg is controlled by the advancing arm 20ª. At the time the egg becomes in this manner released for a discharge from the chute, it becomes necessary also to check the movement of the next following egg and this is done by means of a lever 62 which, at 63, is shown pivotally supported on a bracket 64 of the post 2. The inner end of this lever rides under the cam 55 which, as above described, is depended upon to control the release of the egg from the chute in timed relation to the tipping of the scales to discharge the eggs from the machine.

In the position indicated in Fig. 1, the cam 55 is beginning to move to swing the lever 45 to actuate the scale tipping mechanism and at the same time to cause the rod 60 to rise above the egg which has been held by the rod; but the next following egg is still held in check by the transverse bar 62ª of the lever 62. Further rotation causes the cam to depress the inner end 62ᵇ of the lever 62, thereby to elevate the bar 62ª away from the egg it is retaining, and at the same time slowly to recede from the lever 45ª and so to initiate return movement of the rod 60 to check the advance movement of this second egg. The cam then returns to its initial position, as indicated in Fig. 1. When the end of the lever 62, to which the bar 62ª is affixed, is heavier than the inner end of the lever, it is found that the lever will return to its initial position without any difficulty but, if preferred, it is a simple matter to employ a spring between the lever and the bracket 64 for this purpose.

Mechanism is provided for guiding the eggs to the chute 15 and this mechanism is in the drawings shown to comprise an inclined trough 70 into which the eggs are fed in the first place. In the lower end of this trough is cut an opening 70ª in continued alignment with the chute 15 and of a size to admit the eggs to the chute one by one. Through the center of the trough is cut a slot 71 of a width freely to receive therein a bar 72, the upper end of which is mounted for oscillating movement on a pivot 73 and the latter is supported in posts 74, 74ª of the base 1.

A shaft 75 is mounted in bearings 76 of the machine base and a cam 77 is rigidly secured to this shaft in position to support the lower end of the bar 72. This shaft is rotated to oscillate the bar on its pivot in timed relation to the movement of the eggs through the machine and, at each rotation, to elevate the lower end of the bar a short distance for the purpose which will now be described. Groups of transverse, equidistantly spaced ribs 78 rise from the upper surface of the bar and the distance between adjacent groups is calculated to support an egg within the space between the groups when the egg takes the transverse position indicated at A in Fig. 6. It is noticed, by referring to this view of the drawings, that the upper edges of these ribs are curved and that, for this reason, any egg which lands in the space between adjacent groups of ribs, in the position indicated at B, will roll away from the ribs into the trough when the end of the bar is elevated into the position indicated in the drawings. Further rotation of the cam permits the end of the bar to recede until the upper edges of the ribs move below the bottom surface of the trough, as indicated in dotted outline in Fig. 6, thereby depositing any eggs held thereon on the edges of the slot 71 for discharge on to the chute 15 as soon as space is open for additional eggs thereon.

The mechanism for rotating the cam is shown to include a sprocket wheel 80 on the cam shaft 75 which, by a chain 81, is operatively connected with a sprocket wheel 82 of the shaft 4. And, as above stated, the mechanism is so timed that eggs will always be in position to pass on to the chute when space is available thereon.

At the forward end of the machine is placed an inclined chute 90 along which any egg which is not heavy enough to actuate the scales will be free to descend for discharge into a suitable receptacle.

While I have herein described a preferred form of the invention, I do not intend thereby to be limited to the exact arrangements, proportions or shapes shown in the drawings but reserve the right to embody modifications thereof within the scope of the claims hereto appended.

I claim:

1. In an egg grading machine, a series of stationary track sections in continued horizontal alignment, weighing scales in the spaces between adjacent sections, each scale including a balanced pivotally hung beam and a track section pivotally hung on one end of said beam, a stem downwardly extending from the center of said scale track, a weight adjustably mounted on said stem, said track section being normally held in continued horizontal alignment with said stationary track sections to form therewith a continuous track, each beam being adjustable to yield to an egg above a certain weight, horizontally aligned shafts transversely mounted for rotation at the ends of the machine, sprocket wheels on said shafts, a chain hung on said wheels directly above said track for horizontal movement parallel therewith, elements on said chain for moving eggs along the track, means below the track section of each beam for tipping said section when the beam yields to the weight of an egg, a cam on one of said shafts, a lever mounted for oscillating movement in a vertical plane by said cam, means below said scale track section for tipping the latter when the beam is depressed by an egg, and connections from said lever to operate said track section tipping means in timed relation to the movement of eggs along the tracks by the elements on the chain.

2. In an egg grading machine, a series of stationary track sections in continued horizontal alignment, weighing scales in the spaces between adjacent sections, each scale including a balanced pivotally hung beam, a bracket pivotally hung on one end of said beam, a track section rigidly mounted on said bracket, a stem downwardly extending from the center of said bracket, a weight adjustably mounted on said stem, a counterbalance weight mounted on the other end of said beam normally to maintain the track section of the beam in continued horizontal alignment with said stationary track sections to form therewith a continuous track, the weight on each beam being adjustable to cause the beam to yield to an egg above a certain weight, horizontally aligned shafts transversely mounted for rotation at the ends of the machine, sprocket wheels on said shafts, a chain hung on said wheels directly above said track for horizontal movement parallel therewith, elements on said chain for moving eggs along the track, means below the track section of each beam for tipping said section when the beam yields to the weight of an egg, a cam on one of said shafts, a lever mounted for oscillating movement in a vertical plane by said cam, means below said scale track section for tipping the latter when the beam is depressed by an egg, and connections from said lever to operate said track section tipping means in timed relation to the movement of eggs along the tracks by the elements on the chain.

3. In an egg grading machine, a series of stationary track sections in continued horizontal alignment, weighing scales in the spaces between adjacent sections, each scale including a balanced pivotally hung beam, a bracket pivotally hung on one end of said beam, a track section rigidly mounted on said bracket, a stem downwardly extending from the center of said bracket, a weight adjustably mounted on said stem, a counterbalance weight mounted on the other end of said beam normally to maintain the track section of the beam in continued horizontal alignment with said stationary track sections to form therewith a continuous track, the weight on each beam being adjustable to cause the beam to yield to an egg above a certain weight, horizontally aligned shafts transversely mounted for rotation at the ends of the machine, sprocket wheels on said shafts, a chain hung on said wheels directly above said track for horizontal movement parallel therewith, elements on said chain for moving eggs along the track, a rockshaft below the beam parallel with the track sections, a bellcrank rigidly mounted on said shaft below each beam, a rod pivotally secured to the lower end of each of said bellcranks and forwardly extending therefrom below each scale weight, each rod having an offset portion intermediate its ends, a cam on one of said shafts, a lever mounted for oscillating movement in a vertical plane by said cam, a link on said lever operatively connected to turn said rockshaft thereby to tip the bellcranks and to draw the rods inwardly in moving to cause the offset portion of the rod below an egg-yielding beam to contact and to move the pendent scale weight thereby to tip the scale track section to discharge the egg therefrom.

4. In an egg grading machine, a series of stationary track sections in continued horizontal alignment, weighing scales in the spaces between adjacent sections, each scale including a balanced pivotally hung beam, a bracket pivotally hung on one end of said beam, a track section rigidly mounted on said bracket, a stem downwardly extending from the center of said bracket, a grooved weight adjustably mounted on said stem, a counterbalance weight mounted on the other end of said beam normally to maintain the track section of the beam in continued horizontal alignment with said stationary track sections to form therewith a continuous track, the weight on each beam being adjustable to cause the beam to yield to an egg above a certain weight, horizontally aligned shafts transversely mounted for rotation at the ends of the machine, sprocket wheels on said shafts, a chain hung on said wheels directly above said track for horizontal movement parallel therewith, elements on said chain for moving eggs along the track, a rockshaft below the beam parallel with the track sections, a bellcrank rigidly mounted on said shaft below each beam, a rod pivotally secured to the lower end of each of said bellcranks and forwardly extending therefrom below each scale weight, each rod having an offset portion intermediate its ends, a cam on one of said shafts, a lever mounted for oscillating movement in a vertical plane by said cam, a link on said lever operatively connected to turn said rockshaft thereby to tip the bellcranks and to draw the rods inwardly in moving to cause the offset portion of the rod below an egg-yielding beam to enter the scale weight groove and to move the pendent scale weight thereby to tip the scale track section to discharge the egg therefrom.

RICHARD J. HAYTER.

References Cited in the file of this patent

UNITED STATES PATENTS

| Number | Name | Date |
| --- | --- | --- |
| 1,824,693 | Smith | Sept. 22, 1931 |
| 1,983,093 | Montgomery | Dec. 4, 1934 |
| 2,112,259 | Wyland | Mar. 29, 1938 |
| 2,112,823 | Breuilh | Apr. 5, 1938 |
| 2,158,023 | Smith | May 9, 1939 |
| 2,381,035 | Campbell | Aug. 7, 1945 |

FOREIGN PATENTS

| Number | Country | Date |
| --- | --- | --- |
| 359,735 | Great Britain | Oct. 29, 1931 |